(12) United States Patent
Tsai et al.

(10) Patent No.: US 8,284,840 B2
(45) Date of Patent: Oct. 9, 2012

(54) VIDEO DECODING DEVICE AND METHOD

(75) Inventors: Hsieh-Fu Tsai, Taipei Hsien (TW); Yi-Shin Li, Taipei Hsien (TW); Yi-Shin Tung, Taipei Hsien (TW); Sheng-Che Huang, Taipei Hsien (TW); Chun Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 364 days.

(21) Appl. No.: 12/641,501

(22) Filed: Dec. 18, 2009

(65) Prior Publication Data

US 2011/0096842 A1  Apr. 28, 2011

(30) Foreign Application Priority Data

Oct. 22, 2009 (CN) .......................... 2009 1 0308659

(51) Int. Cl.
*H04N 11/04* (2006.01)
(52) U.S. Cl. .......... 375/240.23; 375/240.26; 375/240.25
(58) Field of Classification Search ............. 375/240.23, 375/240.25, 240.26
See application file for complete search history.

(56) References Cited

U.S. PATENT DOCUMENTS

| 5,796,356 | A | * | 8/1998 | Okada et al. ..................... 341/51 |
| 5,970,177 | A | * | 10/1999 | Chinnock ..................... 382/244 |
| 6,061,398 | A | * | 5/2000 | Satoh et al. ..................... 375/240 |
| 6,411,226 | B1 | * | 6/2002 | Law et al. ........................ 341/65 |
| 6,928,119 | B2 | * | 8/2005 | Yang et al. ............... 375/240.23 |
| 7,353,233 | B1 | * | 4/2008 | Ganca .................................... 1/1 |
| 2001/0021971 | A1 | * | 9/2001 | Gibson et al. ................. 712/215 |
| 2010/0141488 | A1 | * | 6/2010 | Baktir et al. ..................... 341/67 |

* cited by examiner

*Primary Examiner* — Christopher S Kelley
*Assistant Examiner* — Jonathan Torchman
(74) *Attorney, Agent, or Firm* — Altis Law Group, Inc.

(57) ABSTRACT

A video decoding method includes receiving video data and transforming the video data from a Huffman tree to at least one full tree and at least one one-side tree. One microcode corresponding to the video coding standard that has encoded the received video data is read where a format of the read microcode is determined. The method further includes reading video data from the transformed video data according to the consuming length of the read microcode if the format of the read microcode is a leaf, and decoding the read video data according to the decoding field of the read microcode to output a decoding result.

18 Claims, 5 Drawing Sheets

| Bit | 21-20 | 19-17 | 16-5 | 4-3 | 2 | 1 | 0 |
|---|---|---|---|---|---|---|---|
| Field | Format | Consuing length | Decoding | Mode | last | Changing table | Reserved |

FIG. 2

| Bit | 21-20 | 19-17 | 16-14 | 13-7 | 6-0 |
|---|---|---|---|---|---|
| Field | Format | Consuing length | Pattern length | Offset | Reserved |

FIG. 3

| Bit | 21-20 | 19-17 | 16-14 | 13-7 | 6-0 |
|---|---|---|---|---|---|
| Field | Format | Consuing length | Pattern length | Offset | pattern |

FIG. 4

VIDEO DECODING DEVICE AND METHOD

BACKGROUND

1. Technical Field

Embodiments of the present disclosure relate to video decoding, and more particularly to a video decoding device and method.

2. Description of Related Art

Variable length coding (VLC) is the entropy coding used widely by video coding standards such as JPEG, MPEG2, and H.263. Huffman coding is one type of VLC to remove redundant code. Efficient Huffman decoding is necessary to decode high definition (HD) contents.

Presently, much complex hardware is needed to decode video data encoded by multiple video coding standards using Huffman coding, which is un-programmable and hard extends to new standards.

BRIEF DESCRIPTION OF THE DRAWINGS

The details of the disclosure, both as to its structure and operation, can best be understood by referring to the accompanying drawings, in which like reference numbers and designations refer to like elements.

FIG. 2 is a table showing one example of a leaf format of a microcode used in the video decoding device of FIG. 1 in accordance with the present disclosure;

FIG. 3 is a table showing one example of a full tree format of a microcode used in the video decoding device of FIG. 1 in accordance with the present disclosure;

FIG. 4 is a table showing one example of a one-side tree format of a microcode used in the video decoding device of FIG. 1 in accordance with the present disclosure.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
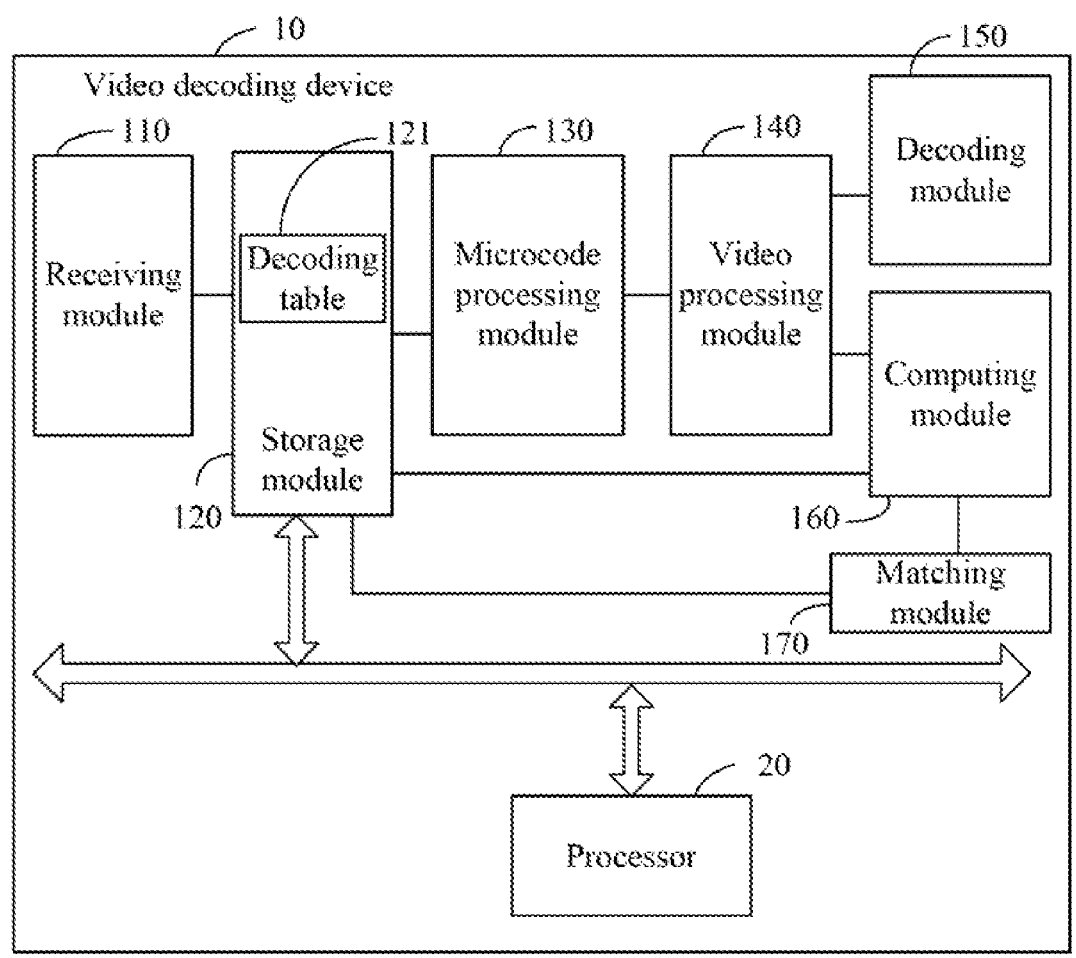
FIG. 1 is a schematic diagram of functional modules of one embodiment of a video decoding device in accordance with the present disclosure.

FIG. 1 is a schematic diagram of functional modules of one embodiment of a video decoding device 10 in accordance with the present disclosure. In one embodiment, the video decoding device 10 is operable to decode different video data that have been encoded by different video coding standards using Huffman trees.

In one embodiment, the video decoding device 10 includes a receiving module 110, a storage module 120, a microcode processing module 130, a video processing module 140, a decoding module 150, a computing module 160, a matching module 170, and at least one processor 20. The modules 110, 130, 140, 150, 160, 170 may include one or more computerized instructions stored in the storage module 120 and executed by the at least one processor 20. The storage module 120 may be a hard drive or a flash memory, for example.

The receiving module 110 is operable to receive video data encoded by one video coding standard using a Huffman tree, and transform the video data from the Huffman tree to at least one full tree and at least one one-side tree.

The storage module 120 is operable to store a plurality of microcodes and a plurality of corresponding decoding tables 121. Each microcode and each corresponding decoding table 121 correspond to one video coding standard, such as JPEG, MPEG2, or H.263, for example. Each microcode is stored in the storage module 120 in an address sequence according to the corresponding decoding table 121. A format of each microcode includes a leaf, a full tree, and a one-side tree.

Referring to FIGS. 2-4, each microcode used in the video decoding device 10 includes 22 bits from "0" to "21". The "21st-20th bits" of each microcode is a format field to indicate a format of the microcode. In one example, the format field indicates that a format of microcode is a leaf if the "21st-20th bits" are "10". The format field indicates a format of microcode is a full tree if the "21st-20th bits" are "00". The format field indicates a format of microcode is a one-side tree if the "21st-20th bits" are "01". The "19th-17th bits" of each microcode is a consuming length field to indicate a bit number of video data to be decoded.

Referring to FIG. 2, the "16th-5th bits" of the microcode with a leaf format is a decoding field to indicate how to decode video data. The "4th-3rd bits" of the microcode with a leaf format is a mode field to indicate different computing methods corresponding to different video coding standards. The "2nd bit" of the microcode with a leaf format is a last field to indicate ending decoding of video data. The "1st bit" of the microcode with a leaf format is a changing table field to indicate whether a decoding table needs to be replaced. The "0th bit" of the microcode with a leaf format is a reserved field reserved for further usage.

Referring to FIG. 3, the "16th-14th bits" of the microcode with a full tree format is a pattern length to indicate a length of a full tree. The "13th-7th bits" of the microcode with a full tree format is an offset field to indicate an offset determined by the corresponding video coding standard and the corresponding decoding table 121. The "6th-0th bits" of the microcode with a full tree format is a reserved field reserved for further usage.

Referring to FIG. 4, the "16th-14th bits" of the microcode with a one-side format is a pattern length to indicate a length of a one-side tree. The "13th-7th bits" of the microcode with a one-side format is an offset field to indicate an offset determined by the corresponding video coding standard and the corresponding decoding table 121. The "6th-0th bits" of the microcode with a one-side format is a pattern field to indicate a pattern used to match with video data. In one embodiment, the pattern field is determined based on the corresponding video coding standard.

The microcode processing module 130 is operable to read one microcode corresponding to the video coding standard coding the received video data and determine a format of the read microcode.

In a first exemplary embodiment, the format of the read microcode may be a leaf. Then, the video processing module 140 is operable to read video data from the transformed video data according to the consuming length of the read microcode. The decoding module 150 is operable to decode the read video data according to the decoding field of the read microcode to output a decoding result. The video processing module 140 further deletes the read video data after the decoding module 150 finishes decoding the read video data. The microcode processing module 130 further determines whether all video data is decoded according to the last field of the read microcode. If not all video data is decoded according to the last field of the read microcode, the microcode processing module 130 further determines whether the corresponding decoding table 121 needs to be replaced according to the changing table field of the read microcode. If the corresponding decoding table 121 needs to be replaced, the video decoding device 10 decodes video data according to a replaced decoding table until all video data is decoded. In one example, the decoding table 121 needs to be replaced if the changing table field is "1", and does not need to be replaced if the changing table field is "0".

In a second exemplary embodiment, the format of the read microcode may be a full tree. Then, the video processing module 140 reads video data from the transformed video data according to the consuming length field of the read microcode. The computing module 160 computes a value of the offset field of the read microcode according to read video data and the corresponding decoding table 121. The computing module 160 further computes an address of a next microcode according to an address of the read microcode, the read video data, and the value of the offset field of the read microcode. In one example, the address of the next microcode is computed according to the following: the address of the read microcode+the value of the offset field of the read microcode+the value of the read video data=the address of the next microcode.

In a third exemplary embodiment, the format of the read microcode may be a one-side tree. Then, the video processing module 140 reads video data from the transformed video data according to the consuming length field of the read microcode. The computing module 160 computes a value of the offset field of the read microcode according to the read video data and the corresponding decoding table 121. The matching module 170 matches the read video data with the pattern field of the read microcode according to the pattern length field of the read microcode and the corresponding video coding standard to obtain a matching result. The computing module 160 further computes an address of a next microcode according to the matching result, the value of the offset field of the read microcode, and the address of the read microcode. In one example, the address of the next microcode is computed according to the following: the address of the read microcode+the value of the offset field of the read microcode+the matching result=the address of the next microcode.

The microcode processing module 130 further reads the next microcode according to the address of the next microcode, and determines a format of the next microcode.

Figure 5:
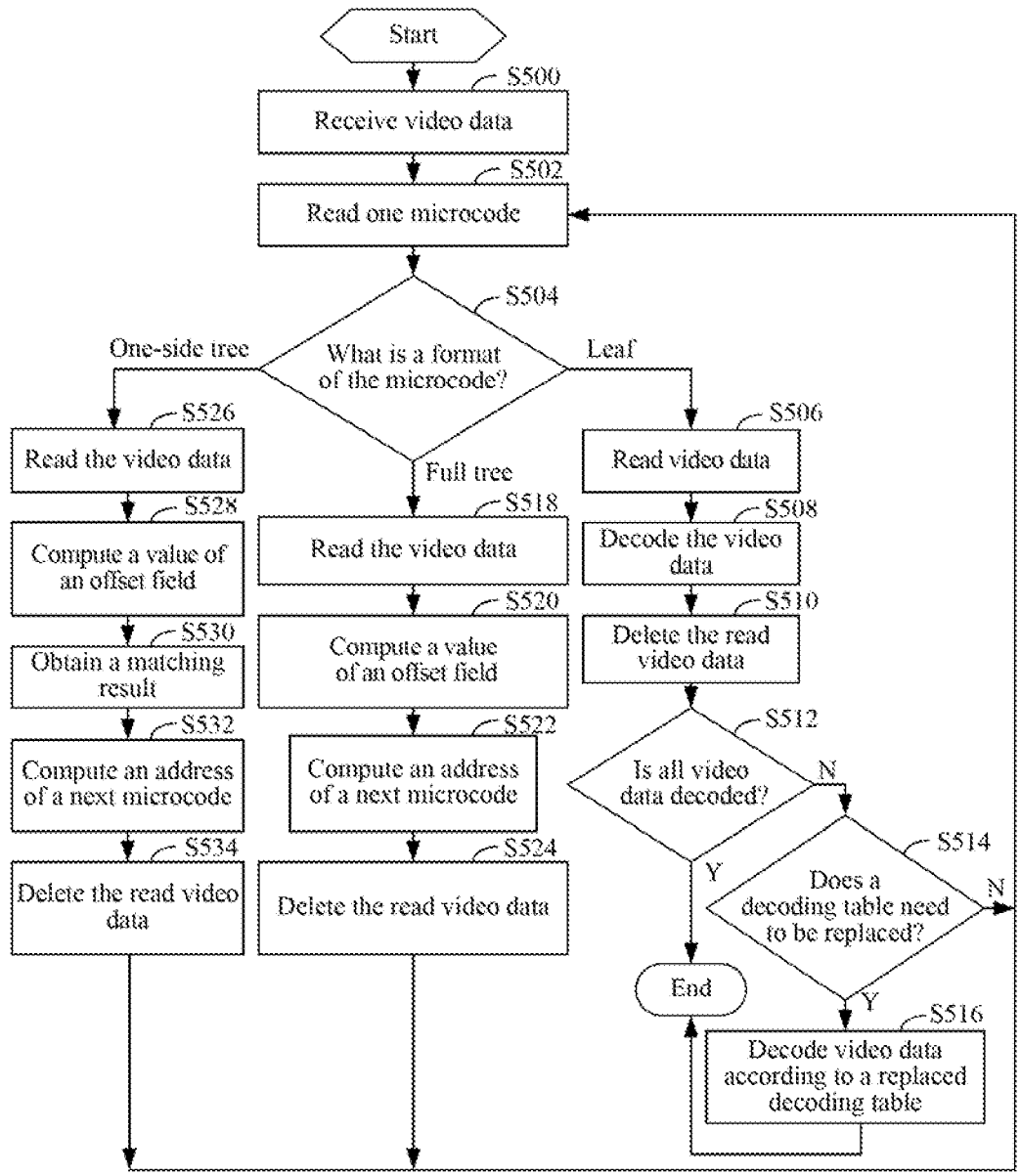
FIG. 5 is a flowchart of one embodiment of a video decoding method in accordance with the present disclosure.

FIG. 5 is a flowchart of one embodiment of a video decoding method in accordance with the present disclosure. The video decoding method is executed by the functional modules of a video decoding device such as, for example, that of FIG. 1. Depending on the embodiment, additional blocks may be added, others deleted, and the ordering of blocks may be changed while remaining well within the scope of the disclosure.

In block S500, the receiving module 110 receives video data encoded by one video coding standard using a Huffman tree, and transforms the video data from a Huffman tree to at least one full tree and at least one one-side tree.

In block S502, the microcode processing module 130 reads one microcode corresponding to the video coding standard that has encoded the received video data.

In block S504, the microcode processing module 130 determines a format of the read microcode. In one embodiment, the format of the read microcode may be a leaf, a full tree, or a one-side tree. The read microcode with a leaf format includes a format field, a consuming length field, a decoding field, a mode field, a last field, and a changing table field. The read microcode with a full tree format includes a format field, a consuming field, a pattern length field, and an offset field. The read microcode with a one-side tree format includes a format field, a consuming field, a pattern length field, an offset field, and a pattern field.

If the format of the read microcode is a leaf, in block S506, the video processing module 140 reads video data from the transformed video data according to the consuming length of the read microcode.

In block S508, the decoding module 150 decodes the read video data according to the decoding field of the read microcode to output a decoding result.

In block S510, the video processing module 140 deletes the read video data according to the consuming length of the read microcode.

In block S512, the microcode processing module 130 determines whether all video data is decoded according to the last field of the read microcode.

In bock S514, the microcode processing module 130 determines whether the corresponding decoding table 121 needs to be replaced according to the changing table field of the read microcode if not all video data is decoded.

If the decoding table 121 needs to be replaced, in block S516, the video decoding device 10 decodes video data according to a replaced decoding table until all video data is decoded.

If the format of the read microcode is a full tree, in block S518, the video processing module 140 reads video data from the transformed video data according to the consuming length field of the read microcode.

In block S520, the computing module 160 computes a value of the offset field of the read microcode according to the read video data and the corresponding decoding table 121.

In block S522, the computing module 160 computes an address of a next microcode according to an address of the read microcode, the read video data, and the value of the offset field of the read microcode. In one example, the address of the next microcode is computed according to the following: the address of the read microcode+the value of the offset field of the read microcode+the value of the read video data=the address of the next microcode.

In block S524, the video processing module 140 deletes the read video data according to the consuming field of the read microcode.

If the format of the read microcode is a one-side tree, in block S526, the video processing module 140 reads video data from the transformed video data according to the consuming length field of the read microcode.

In block S528, the computing module 160 computes a value of the offset field of the read microcode according to the read video data and the corresponding decoding table 121.

In block 530, the matching module 170 matches the read video data with the pattern field of the read microcode according to the pattern length field of the read microcode and the corresponding video coding standard to obtain a matching result.

In block S532, the computing module 160 computes an address of a next microcode according to the matching result, the value of the offset field of the read microcode, and the address of the read microcode. In one example, the address of the next microcode is computed according to the following: the address of the read microcode+the value of the offset field of the read microcode+the matching result=the address of the next microcode.

In block S534, the video processing module 140 deletes the read video data according to the consuming field of the read microcode. Then the process goes back to block S502, the microcode processing module 130 reads the next microcode according to the address of the next microcode. In block S504, the microcode processing module 130 further determines a format of the next microcode.

In the present disclosure, the video decoding device 10 decodes the video data using the microcode corresponding to the video coding standard coding the video data. The microcode is programmable and easily extends to new video coding standards. In addition, the video decoding device 10 combines the full tree and the one-side tree to decode the video data, which increases a decoding speed and reduces memory usage.

While various embodiments of the present disclosure have been described above, it should be understood that they have been presented using example only and not using limitation. Thus the breadth and scope of the present disclosure should not be limited by the above-described embodiments, but should be defined only in accordance with the following claims and their equivalents.

What is claimed is:

1. A video decoding device operable to decode video data encoded by video coding standards using Huffman trees, the video decoding device comprising:
    a receiving module operable to receive video data encoded by one video coding standard using the Huffman tree, and transform the video data from a Huffman tree to at least one full tree and at least one one-side tree;
    a storage module operable to store a plurality of microcodes and a plurality of corresponding decoding tables, wherein each microcode and corresponding decoding table corresponding to one video coding standard, each microcode is stored in the storage module in an address sequence according to the corresponding decoding table, and a format of each microcode comprises a leaf, a full tree, and a one-side tree, wherein the microcode with a leaf format comprises a consuming length field and a decoding field, the consuming length field indicates a bit number of video data to be decoded, and the decoding field indicates how to decode video data;
    a microcode processing module operable to read one microcode corresponding to the video coding standard coding the received video data and determine a format of the read microcode;
    a video processing module operable to read video data from the transformed video data according to the consuming length of the read microcode when the format of the read microcode is a leaf;
    a decoding module operable to decode the read video data according to the decoding field of the read microcode to output a decoding result when the format of the read microcode is a leaf; and
    at least one processor operable to execute the receiving module, the storage module, the microcode processing module, the video processing module, and the decoding module.

2. The video decoding device of claim 1, wherein the video processing module is further operable to delete the read video data after the decoding module finishes decoding the read video data.

3. The video decoding device of claim 1, wherein the microcode with a leaf format further comprises a last field to indicate ending decoding of video data, and a changing table field to indicate whether a decoding table needs to be replaced.

4. The video decoding device of claim 3, wherein the microcode processing module is further operable to determine whether all video data is decoded according to the last field of the read microcode, and determine whether the corresponding decoding table needs to be replaced according to the changing table field of the read microcode when the format of the read microcode is a leaf.

5. The video decoding device of claim 1, wherein:
    the microcode with a full tree format comprises a consuming length field to indicate a bit number of video data to be decoded, a pattern length field to indicate a length of a full tree, and an offset field to indicate an offset; and
    the microcode with a one-side tree comprises a consuming length field to indicate a bit number of video data to be decoded, a pattern length field to indicate a length of a one-side tree, an offset field to indicate an offset, and a pattern field to indicate a pattern used to match with video data.

6. The video decoding device of claim 5, wherein the video processing module is further operable to read video data according to the consuming length field of the read microcode when the format of the read microcode is one of the full tree and the one-side tree.

7. The video decoding device of claim 6, further comprising a computing module operable to compute a value of the offset field of the read microcode according to the read video data and the corresponding decoding table when the format of the read microcode is one of the full tree and the one-side tree.

8. The video decoding device of claim 7, wherein the computing module is further operable to compute an address of a next microcode according to an address of the read microcode, the read video data, and the value of the offset field of the read microcode when the format of the read microcode is a full tree.

9. The video decoding device of claim 7, further comprising a matching module operable to match the read video data with the pattern field of the read microcode according to the pattern length field of the read microcode and the corresponding video coding standard to obtain a matching result when the format of the read microcode is a one-side tree.

10. The video decoding device of claim 9, wherein the computing module is further operable to compute an address of a next microcode according to the matching result, the value of the offset field of the read microcode, and the address of the read microcode when the format of the read microcode is a one-side tree.

11. A video decoding method for decoding video data encoded by video coding standards using Huffman trees, the video decoding method comprising:
    providing a plurality of microcodes and a plurality of corresponding decoding tables, each microcode and each corresponding decoding table corresponding to one video coding standard, each microcode being stored in an address sequence according to the corresponding decoding table, a format of each microcode comprising a leaf, a full tree, and a one-side tree, the microcode with a leaf format comprising a consuming length field and a decoding field, wherein the consuming length field indicates a bit number of video data to be decoded, and the decoding field indicates how to decode video data;
    receiving video data encoded by one video coding standard using a Huffman tree, and transforming the video data from a Huffman tree to at least one full tree and at least one one-side tree;
    reading one microcode corresponding to the video coding standard coding the received video data;
    determining a format of the read microcode;
    reading video data from the transformed video data according to the consuming length of the read microcode if the format of the read microcode is a leaf; and decoding the read video data according to the decoding field of the read microcode to output a decoding result.

12. The video decoding method of claim 11, further comprising:
deleting the read video data according to the consuming length of the read microcode.

13. The video decoding device of claim 12, wherein the microcode with a leaf format further comprises a last field to indicate ending decoding of video data, and a changing table field to indicate whether a decoding table needs to be replaced.

14. The video decoding method of claim 13, further comprising:
determining whether all video data is decoded according to the last field of the read microcode;
determining whether the corresponding decoding table needs to be replaced according to the changing table field of the read microcode if not all video data is decoded; and
replacing the corresponding decoding table if the corresponding decoding table needs to be replaced.

15. The video decoding method of claim 11, wherein the microcode with a full tree format comprises a consuming length field to indicate a bit number of video data to be decoded, a pattern length field to indicate a length of a full tree, and an offset field to indicate an offset.

16. The video decoding method of claim 15, further comprising:
reading video data from the transformed video data according to the consuming length field of the read microcode if the format of the read microcode is a full tree;
computing a value of the offset field of the read microcode according to the read video data and the corresponding decoding table; and
computing an address of a next microcode according to an address of the read microcode, the read video data, and the value of the offset field of the read microcode.

17. The video decoding method of claim 11, wherein the microcode with a one-side tree format comprises a consuming length field to indicate a bit number of video data to be decoded, a pattern length field to indicate a length of a one-side tree, an offset field to indicate an offset, and a pattern field to indicate a pattern used to match with video data.

18. The video decoding method of claim 17, further comprising:
reading video data from the transformed video data according to the consuming length field of the read microcode if the format of the read microcode is a one-side tree;
computing a value of the offset field of the read microcode according to the read video data and the corresponding decoding table;
matching the read video data with the pattern field of the read microcode according to the pattern length field of the read microcode and the corresponding video coding standard to obtain a matching result; and
computing an address of a next microcode according to the matching result, the value of the offset field of the read microcode, and the address of the read microcode.

* * * * *